US012701491B2

(12) United States Patent
Wang

(10) Patent No.: US 12,701,491 B2
(45) Date of Patent: Aug. 4, 2026

(54) DATA COMMUNICATION METHOD AND SYSTEM, DEVICE, AND STORAGE MEDIUM

(71) Applicant: Luxshare Precision Industry Company Limited, Shenzhen (CN)

(72) Inventor: Guanhsiung Wang, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 333 days.

(21) Appl. No.: 18/621,720

(22) Filed: Mar. 29, 2024

(65) Prior Publication Data

US 2024/0365206 A1 Oct. 31, 2024

(30) Foreign Application Priority Data

Apr. 28, 2023 (CN) .......................... 202310490010.7

(51) Int. Cl.
*H04W 40/12* (2009.01)
*H04W 88/04* (2009.01)

(52) U.S. Cl.
CPC ............ *H04W 40/12* (2013.01); *H04W 88/04* (2013.01)

(58) Field of Classification Search
CPC ...... H04W 40/12; H04W 88/04; Y02D 30/70; H04L 69/16; H04L 69/22
See application file for complete search history.

(56) References Cited

U.S. PATENT DOCUMENTS

2013/0294331 A1* 11/2013 Wang .................. H04B 7/2606
370/315
2013/0336202 A1 12/2013 Oh et al.
(Continued)

FOREIGN PATENT DOCUMENTS

CN 107493123 A 12/2017
CN 110868459 A 3/2020
(Continued)

OTHER PUBLICATIONS

Chinese Office Action and Search Report for Chinese Application No. 202310490010.7, dated Jan. 10, 2026, with English translation.
(Continued)

*Primary Examiner* — Ricky Q Ngo
*Assistant Examiner* — Kabir U Jahangir
(74) *Attorney, Agent, or Firm* — Birch, Stewart, Kolasch & Birch, LLP

(57) ABSTRACT

Provided are a data communication method and system, a device, and a storage medium. The data communication method includes generating a pre-request message and sending the pre-request message to each forwarding terminal in a forwarding terminal group; receiving a pre-response message returned by each forwarding terminal, where the pre-response message is generated after a receiving terminal group receives the pre-request message forwarded by a corresponding forwarding terminal and is returned by the receiving terminal group to the corresponding forwarding terminal; determining candidate forwarding terminals from the forwarding terminal group according to the received pre-response message in response to a forwarding terminal screening condition being currently satisfied; and when the candidate forwarding terminals satisfy a transmission condition, forwarding to-be-transmitted data to the receiving terminal group through the candidate forwarding terminals.

20 Claims, 4 Drawing Sheets

(56) References Cited

U.S. PATENT DOCUMENTS

| | | | | |
|---|---|---|---|---|
| 2021/0176820 A1* | 6/2021 | Zhang | ................... | H04W 8/005 |
| 2023/0022773 A1* | 1/2023 | Leon Calvo | .......... | H04W 40/00 |
| 2023/0079552 A1 | 3/2023 | Back et al. | | |

FOREIGN PATENT DOCUMENTS

| | | | |
|---|---|---|---|
| CN | 110913453 A | 3/2020 |
| CN | 114868457 A | 8/2022 |
| TW | I633802 B | 8/2018 |

OTHER PUBLICATIONS

Li et al., "Protocol Design and System Implementation of Distributed Cooperative Transmission," Journal of Signal Processing, vol. 37, No. 9, Sep. 2021, pp. 1612-1622, with an English abstract.
Taiwanese Office Action and Search Report for Taiwanese Application No. 112135925, dated Dec. 12, 2024, with English translation.

* cited by examiner

DATA COMMUNICATION METHOD AND SYSTEM, DEVICE, AND STORAGE MEDIUM

CROSS-REFERENCE TO RELATED APPLICATIONS

This application claims priority to Chinese patent application No. 202310490010.7 filed with the China National Intellectual Property Administration (CNIPA) on Apr. 28, 2023, the disclosure of which is incorporated herein by reference in its entirety.

TECHNICAL FIELD

The present disclosure relates to the field of communication technologies and, in particular, a data communication method and system, a device, and a storage medium.

BACKGROUND

With the continuous development of computer network technologies, the amount of data information transmitted in the network is becoming more and more huge. In the past, data information is transmitted by a sending terminal apparatus through a base station and a relay station. However, due to a long transmission path and too many reflection paths, cooperative communication is often used to implement smooth and efficient transmission of data information and improve the spectrum utilization rate.

Currently, in the industry, a method for performing data communication through cooperative communication often performs data transmission through multiple forwarding terminals. When the amount of data transmitted by the sending terminal and multiple forwarding terminals increases, inter-channel interference, a poor received signal strength indication of a receiving terminal, and overheating of a circuit board of the sending terminal apparatus caused by excessive transmit power of the sending terminal may exist. An existing traditional data communication method cannot avoid the inter-channel interference while taking into account the advantages of cooperative communication.

SUMMARY

The present disclosure provides a data communication method and system, a device, and a storage medium to avoid the inter-channel interference, reduce the error rate of data transmission, ensure reliability of data transmission, increase the amount of information transmitted by the data communication system, and improve the data transmission rate of the data communication system.

An embodiment of the present disclosure provides a data communication method applied to a sending terminal. The method includes generating a pre-request message and sending the pre-request message to each forwarding terminal in a forwarding terminal group; receiving a pre-response message returned by each forwarding terminal, where the pre-response message is generated after a receiving terminal group receives the pre-request message forwarded by a corresponding forwarding terminal and is returned by the receiving terminal group to the corresponding forwarding terminal; if a forwarding terminal screening condition is currently satisfied, determining candidate forwarding terminals from the forwarding terminal group according to the received pre-response message; and when the candidate forwarding terminals satisfy a transmission condition, forwarding to-be-transmitted data to the receiving terminal group through the candidate forwarding terminals.

An embodiment of the present disclosure provides a data communication method applied to a forwarding terminal in a forwarding terminal group. The method includes receiving a pre-request message sent by a sending terminal, sending the pre-request message to a receiving terminal in a receiving terminal group, and receiving a pre-response message generated by the receiving terminal based on the pre-request message; and performing channel precoding according to the pre-response message, encapsulating determined antenna gain information in the pre-response message after the precoding is completed, and returning the pre-response message to the sending terminal.

An embodiment of the present disclosure provides a data communication method applied to a receiving terminal in a receiving terminal group. The method includes receiving a pre-request message sent by a forwarding terminal in a forwarding terminal group; determining a received signal strength indication and channel capacity information between the receiving terminal and the forwarding terminal according to the pre-request message; and encapsulating the received signal strength indication and the channel capacity information in a pre-response message, and sending the pre-response message to the forwarding terminal.

An embodiment of the present disclosure provides a data communication system. The data communication system includes a sending terminal, a forwarding terminal group, and a receiving terminal group.

The forwarding terminal group includes at least one forwarding terminal. The receiving terminal group includes at least one receiving terminal.

The sending terminal includes a first message sending module, a first message receiving module, a candidate terminal determination module, and a data sending module.

The first message sending module is configured to generate a pre-request message and send the pre-request message to each forwarding terminal in the forwarding terminal group.

The first message receiving module is configured to receive a pre-response message returned by each forwarding terminal. The pre-response message is generated after a receiving terminal group receives the pre-request message forwarded by a corresponding forwarding terminal and is returned by the receiving terminal group to the corresponding forwarding terminal.

The candidate terminal determination module is configured to, if a forwarding terminal screening condition is currently satisfied, determine candidate forwarding terminals from the forwarding terminal group according to the received pre-response message.

The data sending module is configured to, when the candidate forwarding terminals satisfy a transmission condition, forward to-be-transmitted data to the receiving terminal group through the candidate forwarding terminals.

An embodiment of the present disclosure provides an electronic device. The electronic device includes at least one processor and a memory communicatively connected to the at least one processor.

The memory stores a computer program executable by the at least one processor. The computer program is executed by the at least one processor to cause the at least one processor to execute the data communication method provided in the preceding embodiments.

An embodiment of the present disclosure provides a non-transitory computer-readable storage medium. The computer-readable storage medium stores a computer instruction. The computer instruction is configured to cause a processor to implement the data communication method provided in the preceding embodiments of the data communication method when the processor is executed.

According to the data communication method and system, the device, and the storage medium provided in the embodiments of the present disclosure, in the preceding technical schemes, a pre-request message is generated and sent to each forwarding terminal in a forwarding terminal group. A pre-response message returned by each forwarding terminal is received. The pre-response message is generated after a receiving terminal group receives the pre-request message forwarded by a corresponding forwarding terminal and is returned by the receiving terminal group to the corresponding forwarding terminal. If a forwarding terminal screening condition is currently satisfied, candidate forwarding terminals are determined from the forwarding terminal group according to the received pre-response message. When the candidate forwarding terminals satisfy a transmission condition, to-be-transmitted data is forwarded to the receiving terminal group through the candidate forwarding terminals. According to the preceding technical schemes, by screening the forwarding terminals, the candidate forwarding terminals capable of efficiently performing data communication are determined. Data communication is performed through the candidate forwarding terminals, thereby avoiding the inter-channel interference, reducing the error rate of data transmission, ensuring the reliability of data transmission, increasing the amount of information transmitted by the data communication system, and improving the data transmission rate of the data communication system.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

To illustrate technical schemes in embodiments of the present disclosure more clearly, the drawings used in description of the embodiments are briefly described below. Apparently, the drawings described below illustrate part of embodiments of the present disclosure, and those skilled in the art may obtain other drawings based on the drawings described below on the premise that no creative work is done.

DETAILED DESCRIPTION

For a better understanding of the technical schemes by those skilled in the art, the technical schemes in embodiments of the present disclosure are described clearly and completely in conjunction with the drawings in embodiments of the present disclosure. Apparently, the embodiments described below are part, not all, of the embodiments of the present disclosure. Based on the embodiments described herein, all other embodiments obtained by those skilled in the art on the premise that no creative work is done are within the scope of the present disclosure.

It is to be noted that the terms "first", "second", and "target" in the description, claims, and preceding drawings of the present disclosure are used for distinguishing between similar objects and are not necessarily used for describing a particular order or sequence. It is to be understood that the data used in this way is interchangeable where appropriate so that the embodiments of the present disclosure described herein may also be implemented in a sequence not illustrated or described herein. In addition, the terms "including", "having", or any other variations thereof described herein are intended to encompass a non-exclusive inclusion. For example, a process, method, system, product, or device that includes a series of steps or units may include not only the expressly listed steps or units but also other steps or units that are not expressly listed or are inherent to such a process, method, product, or device.

Embodiment One

Figures 1, 2:
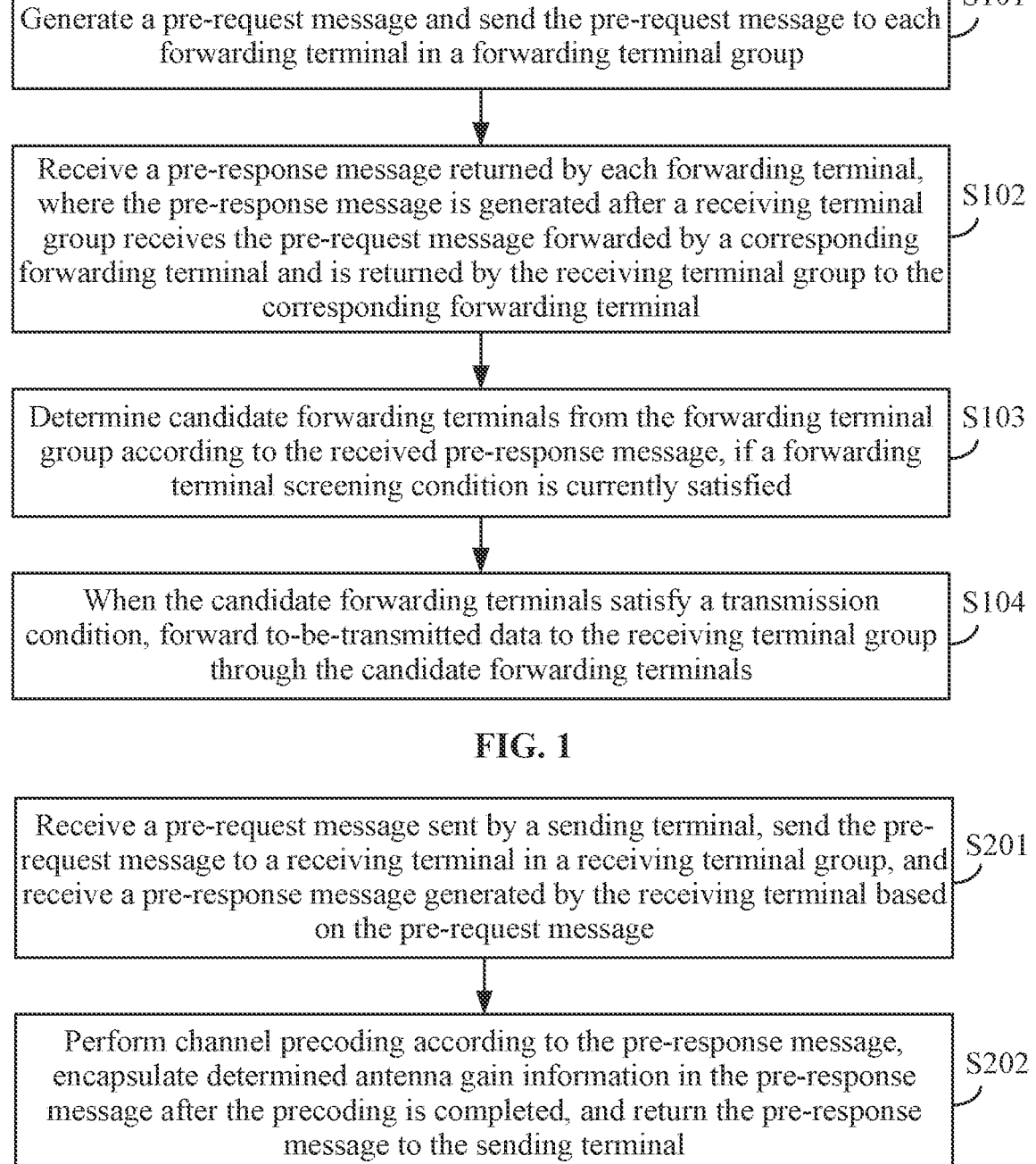
FIG. 1 is a flowchart of a data communication method according to embodiment one of the present disclosure.
FIG. 2 is a flowchart of a data communication method according to embodiment two of the present disclosure.

FIG. 1 is a flowchart of a data communication method according to embodiment one of the present disclosure. This embodiment may be applicable to the case in which a sending terminal performs cooperative communication in a data communication system. The method may be executed by the data communication system. The data communication system may be implemented by hardware and/or software.

As shown in FIG. 1, the method includes the following:

In S101, a pre-request message is generated and sent to each forwarding terminal in a forwarding terminal group.

In this embodiment, the pre-request message may be understood as a pre-request signal, and a precoding instruction for a forwarding terminal is included in the pre-request message.

In an embodiment, a sending terminal generates the pre-request message according to request information for a receiving terminal and the precoding instruction for the forwarding terminal. The pre-request message is sent to each forwarding terminal in the forwarding terminal group.

In S102, a pre-response message returned by each forwarding terminal is received. The pre-response message is generated after a receiving terminal group receives the pre-request message forwarded by a corresponding forwarding terminal and is returned by the receiving terminal group to the corresponding forwarding terminal.

In this embodiment, the pre-response message may be understood as a message generated by a receiving terminal group based on response information fed back according to the pre-request message.

In an embodiment, after the sending terminal sends the pre-request message to each forwarding terminal in the forwarding terminal group, each forwarding terminal forwards the pre-request message to each receiving terminal in the receiving terminal group. After receiving the pre-request message forwarded by a corresponding forwarding terminal, a receiving terminal generates corresponding response information according to the content of the pre-request message. The pre-response message is generated according to the response information and is returned to the corresponding forwarding terminal. The forwarding terminal then returns the received pre-response message to the sending terminal. It is to be understood that both the pre-request message and the pre-response message are pre-messages generated and transmitted before data communication is performed.

In S103, if a forwarding terminal screening condition is currently satisfied, candidate forwarding terminals are determined from the forwarding terminal group according to the received pre-response message.

In this embodiment, the forwarding terminal screening condition may be understood as a condition that the forwarding terminal screening in the forwarding terminal group may be started. For example, the condition may be that the pre-response message is not empty, or may also be other conditions. This is not limited in this embodiment. The candidate forwarding terminal may be understood as a forwarding terminal selected from the forwarding terminal group for the data communication.

In an embodiment, after the pre-response message returned by each forwarding terminal is received, it is determined whether the forwarding terminal screening condition is satisfied according to the pre-response message. If the forwarding terminal screening condition is currently satisfied, screening is further performed on the forwarding terminal group to determine candidate forwarding terminals capable of performing the data communication. If the forwarding terminal screening condition is not satisfied currently, the step S101 is returned to be re-executed, that is, a pre-request message is generated and sent to each forwarding terminal in the forwarding terminal group.

In an embodiment, S103 in which the candidate forwarding terminals are determined from the forwarding terminal group according to the received pre-response message, if the forwarding terminal screening condition is currently satisfied includes the steps described below.

In S1031, if pre-response messages returned by all forwarding terminals in the forwarding terminal group are currently received, it is confirmed that the forwarding terminal screening condition is currently satisfied.

In this embodiment, it is confirmed whether the number of received forwarding pre-response messages returned by forwarding terminals is the same as the number of all forwarding terminals in the forwarding terminal group. If so, it is determined that the sending terminal receives pre-response messages returned by all available forwarding terminals in the forwarding terminal group, therefore, it is confirmed that the forwarding terminal screening condition is currently satisfied. Otherwise, it is confirmed that the number of pre-response messages received by the sending terminal is inconsistent with the number of all forwarding terminals in the forwarding terminal group, the forwarding terminal screening condition is not satisfied, and a pre-request message is regenerated and sent to each forwarding terminal in the forwarding terminal group.

In S1032, a received signal strength indication and channel capacity information from a corresponding forwarding terminal to a receiving terminal in the receiving terminal group, and antenna gain information of the corresponding forwarding terminal are acquired in each pre-response message.

In this embodiment, the received signal strength indication (RSSI) may be understood as the strength indication of a signal received by a receiving terminal from each forwarding terminal. The channel capacity information may be understood as information about the channel capacity between each forwarding terminal and a receiving terminal. The antenna gain information may be understood as intensity information of antenna radiation of each forwarding terminal in any direction of free space.

In an embodiment, after the pre-response message returned by the forwarding terminal is received, the received signal strength indication when the receiving terminal receives the pre-request message sent by each forwarding terminal, the channel capacity information between the receiving terminal and each forwarding terminal, and the antenna gain information of the forwarding terminal when the forwarding terminal performs the data transmission, which are included in the pre-response message, are acquired.

In S1033, according to the channel capacity information of each forwarding terminal, a sum rate corresponding to all forwarding terminals is determined.

In this embodiment, the sum rate may be understood as the total transmission rate sum of forwarding terminals.

In an embodiment, a channel state corresponding to each forwarding terminal is determined according to information such as the channel capacity information of each forwarding terminal. The sum rate corresponding to all forwarding terminals is determined according to parameters such as the number of channels and the number of antennas.

Exemplarily, when a multiple-in multiple-out (MIMO) system formed by the forwarding terminal group and the receiving terminal is considered, it is assumed that there are $\beta$ forwarding terminals in the forwarding terminal group, and a signal is sent in $\alpha$ channels. The number of transmit antennas of each forwarding terminal is the same and denoted as $\alpha_t$, and the number of receive antennas of each forwarding terminal is the same and denoted as $\alpha_r$. $U_\alpha$ denotes a set of receiving terminals sent to an $\alpha^{th}$ channel. $\beta(\alpha)$ denotes the number of receiving terminal apparatuses sent to the $\alpha^{th}$ channel. Hap denotes the channel response and has the dimension of $a_r \times a_t$. $T_{\alpha,\beta}$ denotes a precoding matrix. $A_{\alpha,\beta}$ denotes independently distributed Gaussian white noise.

$$E\left[A_{\alpha,\beta}A_{\alpha,\beta}^H\right] = N_{a_r}$$

denotes a covariance matrix. Therefore, there are $\beta$ forwarding terminals in the forwarding terminal group, the total transmission rate sum $S_{\alpha,\beta}$ of signals sent in the $\alpha$ channels is that: where $$S_{\alpha,\beta}\left(H_{\alpha,\beta'}T_{\alpha,\beta'}\mid_{\beta'\in U_\alpha}\right) = \frac{1}{2}\log\left|N_{a_r} + \sigma_{\alpha,\beta}^{-1}H_{\alpha,\beta}T_{\alpha,\beta}T_{\alpha,\beta}^H H_{\alpha,\beta}^H\right|,$$

where $$\sigma_{\alpha,\beta} = \sum_{\beta' \in U_{\alpha,\beta} \neq \beta} H_{\alpha,\beta} T_{\alpha,\beta'} T_{\alpha,\beta'}^H H_{\alpha,\beta}^H + N_{ar},$$

and the total transmission rate sum of signals sent in all channels in a candidate transmission terminal apparatus group is $$\sum s_{\alpha,\beta}.$$

In S1034, the candidate forwarding terminals are determined from the forwarding terminal group according to the received signal strength indication, the sum rate, and the antenna gain information.

In this embodiment, aiming at maximizing a data stream transmitted cooperatively, the candidate forwarding terminals are selected from the forwarding terminal group according to the received signal strength indication, the sum rate, and the antenna gain information that correspond to each forwarding terminal. A manner of determining the candidate forwarding terminals may include determining the candidate forwarding terminals according to the ranking of the received signal strength indication, sum rate, and antenna gain information of each forwarding terminal or according to a preset standard value. This is not limited in this embodiment.

Furthermore, the step S1034 in which the candidate forwarding terminals are determined from the forwarding terminal group according to the received signal strength indication, the sum rate, and the antenna gain information includes the following steps.

(A1) A channel transmission frequency corresponding to each forwarding terminal is determined, and channel frequency-domain orthogonality between forwarding terminals is determined based on the channel transmission frequency.

In this embodiment, the transmission frequency of a forwarding terminal is determined according to the received signal strength indication from each corresponding forwarding terminal to a receiving terminal in the receiving terminal group. According to the transmission frequency, it is confirmed whether the channel of the corresponding forwarding terminal has channel frequency-domain orthogonality, that is, to confirm whether the channel of the corresponding forwarding terminal is an orthogonal channel.

(B1) The forwarding terminals are sorted under each grouping dimension from large to small by respectively using the received signal strength indication, the sum rate, the antenna gain information, and the channel frequency-domain orthogonality as the grouping dimension.

In this embodiment, the received signal strength indication indicates that the path loss between a receiving terminal in the receiving terminal group and a corresponding forwarding terminal represented by the received signal strength indication changes with time. Therefore, the received signal strength of the receiving terminal in the receiving terminal group is not fixed. The receiver gain of the receiving terminal in the receiving terminal group has an automatic gain control (AGC) mechanism. Thus, the received signal-to-noise ratio (SNR) and the receiving linearity of the receiving terminal in the receiving terminal group may be maintained at the same time. If the received signal strength indication is too poor, it represents that the path loss between the corresponding forwarding terminal and the receiving terminal group is too large. This may lead to poor quality of the signal transmitted from the corresponding forwarding terminal to the receiving terminal in the receiving terminal group. Therefore, the stronger the received signal strength indication of a message received by a receiving terminal and transmitted from a forwarding terminal, the smaller the path loss between the corresponding forwarding terminal and the receiving terminal in the receiving terminal group. Taking the received signal strength indication as the grouping dimension, the received signal strength indication of each forwarding terminal received by the sending terminal is sorted from strong to weak.

The sum rate among forwarding terminals may reflect the capacity of data that each forwarding terminal is capable of transmitting. The higher the sum rate, the larger the data that may be transmitted. Taking the sum rate as the grouping dimension, the forwarding terminals are sorted from large to small according to the sum rate.

The antenna gain in the antenna gain information may reflect that the transmission power energy ratio of the printed circuit board (PCB) level when each forwarding terminal needs to achieve the same effective (or equivalent) isotropic radiation power. The stronger the antenna gain of the forwarding terminal, the larger the equivalent isotropically radiated power (EIRP), and the longer the transmission distance. Taking the antenna gain information as the grouping dimension, the forwarding terminals are sorted from high to low according to the antenna gain.

When data communication is performed through multiple forwarding terminals in the forwarding terminal group, the zero point of an adjacent-frequency signal often causes destructive interference on the channel. To avoid the adjacent-frequency interference, taking channel frequency-domain orthogonality as the grouping dimension, a forwarding terminal of an orthogonal channel using orthogonal frequency-division multiplexing is distinguished from a forwarding terminal of a non-orthogonal channel. When an orthogonal channel having the channel frequency-domain orthogonality is used, the zero point of an adjacent-frequency signal is aligned with the zero point of this channel, thereby effectively avoiding the destructive interference on the peak of the channel.

(C1) According to a sorting result of forwarding terminals in each grouping dimension, a forwarding terminal with the preset top rank in the sorting result is selected as the candidate forwarding terminal.

In this embodiment, the candidate terminal is determined according to the received signal strength indication rank of each forwarding terminal, the sum rate rank of each forwarding terminal, the antenna gain rank of each forwarding terminal, and whether the forwarding terminal is an orthogonal channel. For example, the top five forwarding terminals in each dimension are used as candidate forwarding terminals. If there are duplicate forwarding terminals in different sorting results, the rank is postponed. The candidate forwarding terminals may be determined from the forwarding terminal group in another manner. This is not limited in this embodiment.

In S104, when the candidate forwarding terminals satisfy a transmission condition, to-be-transmitted data is forwarded to the receiving terminal group through the candidate forwarding terminals.

In this embodiment, the transmission condition may be understood as a condition for transmitting the to-be-transmitted data through a data communication system, for example, the total data capacity that may be transmitted by the candidate forwarding terminals is greater than the data size of the to-be-transmitted data. The to-be-transmitted data may be understood as communication data waiting for and transmitted by the candidate forwarding terminals after the screening of the candidate forwarding terminals is completed.

In an embodiment, after the candidate forwarding terminals are determined, it is determined whether the candidate forwarding terminals may satisfy the transmission condition. If the candidate forwarding terminals satisfy the transmission condition, the to-be-transmitted data is diverted according to the channel capacity of each candidate forwarding terminal. The diverted to-be-transmitted data is forwarded to the receiving terminal group through the corresponding candidate forwarding terminal.

In an embodiment, the transmission condition satisfied by the candidate forwarding terminals is that the total sum rate of frequency bands of selected candidate forwarding terminals is greater than or equal to the data size of the to-be-transmitted data. The total sum rate of frequency bands may be understood as the total sum rate of all candidate forwarding terminals. In an embodiment, if the total sum rate of frequency bands of candidate forwarding terminals is greater than or equal to the data size of the to-be-transmitted data, it is determined that the transmission condition is satisfied. The to-be-transmitted data is forwarded to the receiving terminal group through the candidate forwarding terminals.

Accordingly, the data communication method provided in this embodiment also includes, if the currently determined candidate forwarding terminals do not satisfy the transmission condition, returning to re-execute the step of determining candidate forwarding terminals from the forwarding terminal group according to the received pre-response message.

Exemplarily, after the candidate forwarding terminals are determined, the total sum rate of frequency bands of the candidate forwarding terminals is calculated. It is determined whether the total sum rate of frequency bands of the candidate forwarding terminals is greater than or equal to the data size of the to-be-transmitted data. If the total sum rate of frequency bands is greater than or equal to the data size of the to-be-transmitted data, it is determined that the candidate forwarding terminals satisfy the transmission condition. The size of data that may be transmitted by each candidate forwarding terminal is determined according to the channel capacity of each candidate forwarding terminal. The to-be-transmitted data is diverted according to the size of data that may be transmitted by each candidate forwarding terminal. The diverted to-be-transmitted data segment is forwarded to a corresponding receiving terminal in the receiving terminal group through the corresponding candidate forwarding terminal. If the total sum rate of frequency bands is less than the data size of the to-be-transmitted data, the step of determining the candidate forwarding terminals from the forwarding terminal group according to the received pre-response message is returned and re-executed.

In this embodiment, a pre-request message is generated and sent to each forwarding terminal in a forwarding terminal group. A pre-response message returned by each forwarding terminal is received. The pre-response message is generated after a receiving terminal group receives the pre-request message forwarded by a corresponding forwarding terminal and is returned by the receiving terminal group to the corresponding forwarding terminal. According to the received pre-response message, the candidate forwarding terminals are determined from the forwarding terminal group if the forwarding terminal screening condition is currently satisfied. When the candidate forwarding terminals satisfy a transmission condition, to-be-transmitted data is forwarded to the receiving terminal group through the candidate forwarding terminals.

According to the preceding technical schemes, by screening the forwarding terminal, the candidate forwarding terminals capable of efficiently performing the data communication are determined, and data communication is performed through the candidate forwarding terminals. In this manner, the adjacent-frequency interference and co-channel interference among channels are avoided, the error rate of data transmission is reduced, the reliability of data transmission is ensured, the amount of information transmitted by the data communication system is increased, and the data transmission rate of the data communication system is improved.

Embodiment Two

FIG. 2 is a flowchart of a data communication method according to embodiment two of the present disclosure. This embodiment may be applicable to the case in which a forwarding terminal in a forwarding terminal group performs cooperative communication in a data communication system. The method may be executed by the data communication system. The data communication system may be implemented by hardware and/or software.

As shown in FIG. 2, the method includes the following steps.

In S201, a pre-request message sent by a sending terminal is received, the pre-request message is sent to a receiving terminal in a receiving terminal group, and a pre-response message generated by the receiving terminal based on the pre-request message is received.

In this embodiment, each forwarding terminal in the forwarding terminal group receives the pre-request message sent by the sending terminal. The pre-request message includes a precoding instruction. The forwarding terminal executes a precoding preparation action according to the precoding instruction and executes precoding when a precoding triggering condition is satisfied. In addition, the forwarding terminal forwards the pre-request message to a corresponding receiving terminal in the receiving terminal group. After the receiving terminal receives the pre-request message and generates a pre-response message according to the pre-request message, the forwarding terminal receives the pre-response message sent by the receiving terminal.

In S202, channel precoding is performed according to the pre-response message, determined antenna gain information is encapsulated in the pre-response message after the precoding is completed, and the pre-response message is returned to the sending terminal.

In this embodiment, after each forwarding terminal receives a pre-response message returned by a corresponding receiving terminal in the receiving terminal group, a state of a channel between each forwarding terminal and the receiving terminal is determined according to the pre-response message. According to the state of the channel, encoding is performed for the purpose of error correction, and spatial characteristics are optimized. This can dynamically control power and adjust a phase to maximize the signal-to-noise ratio, a certain power gain for the receiving terminal is provided, and signal processing complexity of the receiving terminal is reduced. After channel precoding is completed, the antenna gain information of the forwarding terminal is encapsulated in the received pre-response message. The pre-response message after encapsulation processing is returned to the sending terminal.

In this embodiment, a pre-response message sent by a sending terminal is received. The pre-response message is sent to a receiving terminal in a receiving terminal group. A pre-response message generated by the receiving terminal based on the pre-request message is received. Channel precoding is performed according to the pre-response message. After precoding is completed, determined antenna gain information is encapsulated in the pre-response message, and the pre-response message is returned to the sending terminal. According to the preceding technical schemes, channel precoding is performed on the forwarding terminal, multi-user interference between multiple forwarding terminals in the forwarding terminal group is effectively suppressed, a system capacity is effectively improved, decoding and algorithm complexity of a receiving terminal apparatus is reduced, and power gain for the receiving terminal and spatial multi-task gain of the forwarding terminal group are provided.

Embodiment Three

Figure 3:
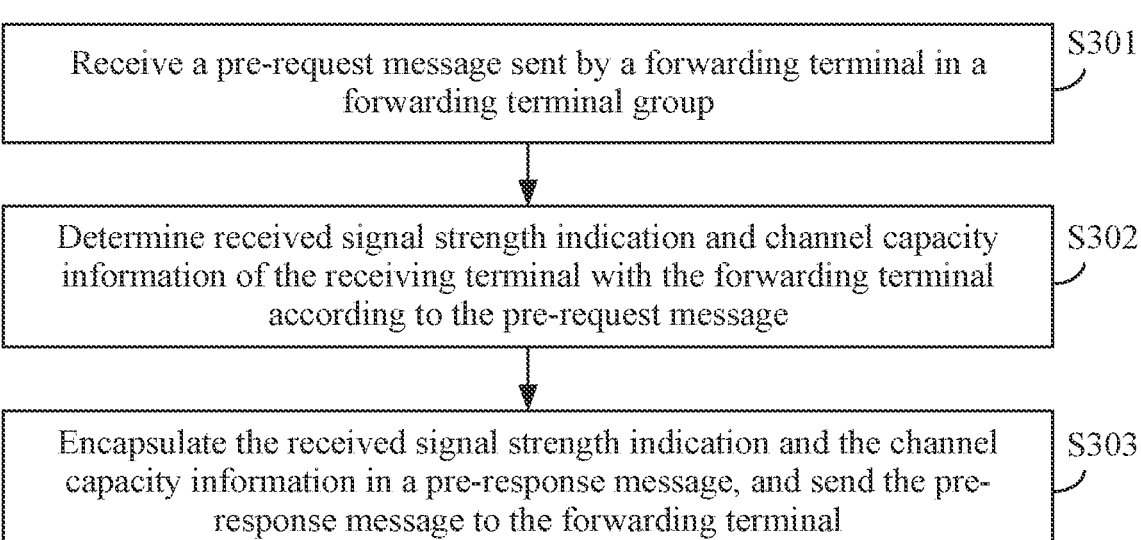
FIG. 3 is a flowchart of a data communication method according to embodiment three of the present disclosure.

FIG. 3 is a flowchart of a data communication method according to embodiment three of the present disclosure. This embodiment may be applicable to the case in which a receiving terminal in a receiving terminal group performs cooperative communication in a data communication system. The method may be executed by the data communication system. The data communication system may be implemented by hardware and/or software.

As shown in FIG. 3, the method includes the following steps.

In S301, a pre-request message sent by a forwarding terminal in a forwarding terminal group is received.

In this embodiment, each receiving terminal in the receiving terminal group receives a pre-request message sent by a corresponding forwarding terminal in the forwarding terminal group.

In S302, a received signal strength indication and channel capacity information from the receiving terminal to the forwarding terminal are determined according to the pre-request message.

In this embodiment, after the pre-request message is received, a response is made to the pre-request message. According to the pre-request message, the received signal strength indication of a receiving terminal to a corresponding forwarding terminal and channel capacity information between each forwarding terminal and a receiving terminal are determined.

In S303, the received signal strength indication and the channel capacity information are encapsulated in a pre-response message, and the pre-response message is sent to the forwarding terminal.

In this embodiment, after each receiving terminal determines the received signal strength indication and the channel capacity information, the received signal strength indication and the channel capacity information are encapsulated to form the pre-response message. The pre-response message is sent to the forwarding terminal.

In this embodiment, a pre-request message sent by a forwarding terminal in a forwarding terminal group is received. The received signal strength indication and channel capacity information from the receiving terminal to the forwarding terminal are determined according to the pre-request message. The received signal strength indication and the channel capacity information are encapsulated in a pre-response message. Then, the pre-response message is sent to the forwarding terminal. According to the preceding technical schemes, the receiving terminal determines the received signal strength indication and channel capacity information according to the received pre-request message and generates a pre-response message so that the forwarding terminal performs precoding according to the pre-response message. The sending terminal determines candidate forwarding terminals according to the pre-response message, thus providing a significant auxiliary effect for optimizing data transmission by the data communication system.

Embodiment Four

Figure 4:
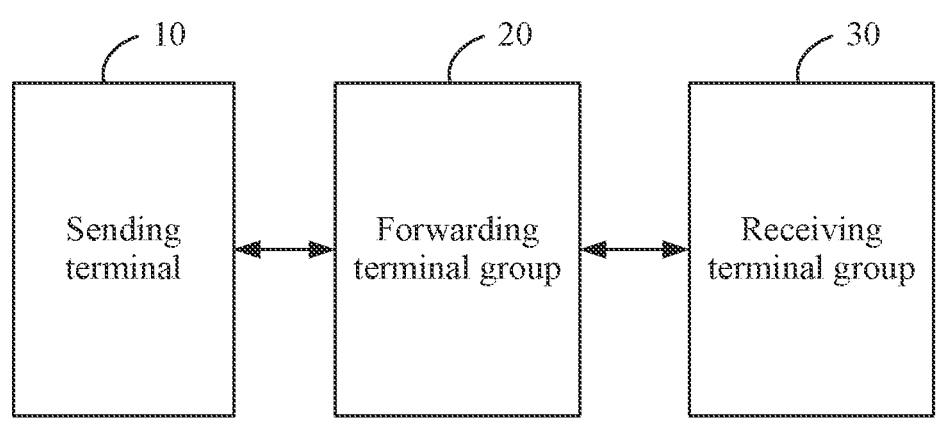
FIG. 4 is a diagram illustrating the structure of a data communication system according to embodiment four of the present disclosure.

FIG. 4 is a diagram illustrating the structure of a data communication system according to embodiment four of the present disclosure. As shown in FIG. 4, the system includes a sending terminal 10, a forwarding terminal group 20, and a receiving terminal group 30.

Figure 5:
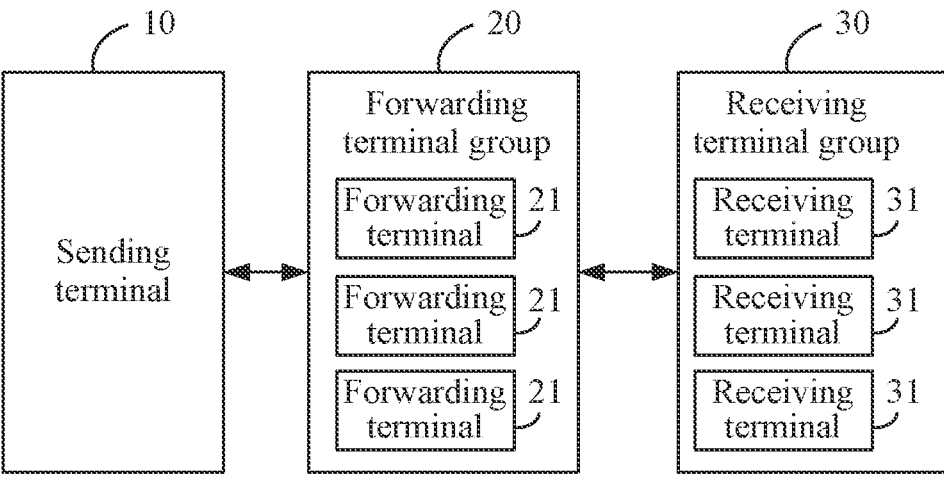
FIG. 5 is a diagram illustrating the structure of another data communication system according to embodiment four of the present disclosure.

FIG. 5 is a diagram illustrating the structure of another data communication system according to embodiment four of the present disclosure. As shown in FIG. 5, the system includes a sending terminal 10, a forwarding terminal group 20, and a receiving terminal group 30. The forwarding terminal group 20 includes at least one forwarding terminal 21. The receiving terminal group includes at least one receiving terminal 31. As shown in FIG. 5, after the sending terminal 10 sends a broadcast message, the broadcast message is forwarded by each forwarding terminal 21 in the forwarding terminal group 20 to multiple receiving terminals 31 in the receiving terminal group 30. Each receiving terminal 31 has received the broadcast message sent by the sending terminal 10. In the data communication system shown in FIG. 5, after the broadcast message sent by the sending terminal 10 is forwarded by each forwarding terminal 21, the multiple receiving terminals 31 are all used as final receiving terminals to receive the broadcast message.

Figure 6:
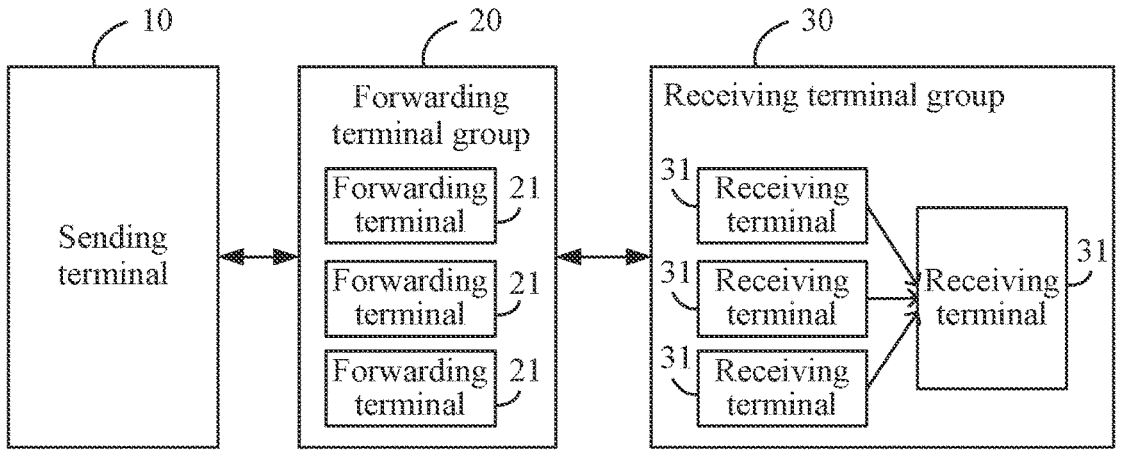
FIG. 6 is a diagram illustrating the structure of another data communication system according to embodiment four of the present disclosure.

FIG. 6 is a diagram illustrating the structure of another data communication system according to embodiment four of the present disclosure. As shown in FIG. 6, the system includes a sending terminal 10, a forwarding terminal group 20, and a receiving terminal group 30. The forwarding terminal group 20 includes at least one forwarding terminal 21. The receiving terminal group includes at least one receiving terminal 31. As shown in FIG. 6, the sending terminal 10 diverts a message to each forwarding terminal 21 in the forwarding terminal group 20. Each forwarding terminal 21 forwards the message to each receiving terminal 31 in the receiving terminal group 30. After receiving the message, each receiving terminal 31 diverts and forwards data to a final receiving terminal 31. In the data communication system shown in FIG. 6, after the message sent by the sending terminal 10 is forwarded to the receiving terminal group 30 via each forwarding terminal 21, multiple receiving terminals 31 forward the message to the final receiving terminal 31 after receiving the message. In this case, only one receiving terminal 31 is used as the final receiving terminal to receive the complete message sent by the sending terminal 10.

It is to be understood that, in the data communication system, a forwarding terminal may be a mobile terminal or a fixed terminal. Accordingly, a receiving terminal may be a mobile terminal or a fixed terminal. This is not limited in this embodiment.

Figure 7:
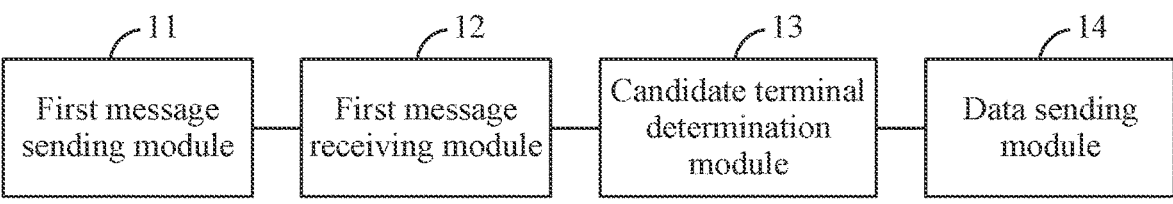
FIG. 7 is a diagram illustrating the structure of a sending terminal in the data communication system according to embodiment four of the present disclosure.

FIG. 7 is a diagram illustrating the structure of a sending terminal in a data communication system according to embodiment four of the present disclosure. As shown in FIG. 7, a sending terminal 10 includes a first message sending module 11, a first message receiving module 12, a candidate terminal determination module 13, and a data sending module 14.

The first message sending module 11 is configured to generate a pre-request message and send the pre-request message to each forwarding terminal in a forwarding terminal group.

The first message receiving module 12 is configured to receive a pre-response message returned by each forwarding terminal. The pre-response message is generated after a receiving terminal group receives the pre-request message forwarded by a corresponding forwarding terminal and is returned by the receiving terminal group to the corresponding forwarding terminal.

The candidate terminal determination module 13 is configured to determine candidate forwarding terminals from the forwarding terminal group according to the received pre-response message, if a forwarding terminal screening condition is currently satisfied.

The data sending module 14 is configured to, when the candidate forwarding terminals satisfy a transmission condition, forward to-be-transmitted data to the receiving terminal group through the candidate forwarding terminals.

According to the data communication system in the technical schemes, by screening the forwarding terminal, candidate forwarding terminals capable of efficiently performing data communication are determined, and data communication is performed through the candidate forwarding terminals, the adjacent-channel interference and co-channel interference among channels are avoided, the error rate of data transmission is reduced, reliability of data transmission is ensured, the amount of information transmitted by the data communication system is increased, and the data transmission rate of the data communication system is improved.

In an embodiment, the candidate terminal determination module 13 includes a condition satisfaction determination unit, an information acquisition unit, a sum rate calculation unit, and a candidate terminal determination unit.

The condition satisfaction determination unit is configured to, if pre-response messages returned by all forwarding terminals in the forwarding terminal group are currently received, confirm that the forwarding terminal screening condition is currently satisfied.

The information acquisition unit is configured to acquire, in each pre-response message, a received signal strength indication and channel capacity information from a corresponding forwarding terminal to a receiving terminal in the receiving terminal group, and antenna gain information of the corresponding forwarding terminal.

The sum rate calculation unit is configured to determine a sum rate corresponding to all forwarding terminals according to each piece of channel capacity information.

The candidate terminal determination unit is configured to determine the candidate forwarding terminals from the forwarding terminal group according to the received signal strength indication, the sum rate, and the antenna gain information.

In an embodiment, the candidate terminal determination unit is configured to: determine a channel transmission frequency corresponding to each forwarding terminal, and determine channel frequency-domain orthogonality between the forwarding terminals based on the channel transmission frequency; respectively use the received signal strength indication, the sum rate, the antenna gain information, and the channel frequency-domain orthogonality as grouping dimensions and sort the forwarding terminals under each grouping dimension from large to small; and select a forwarding terminal with the preset top rank in each sorting result as the candidate forwarding terminal according to the sorting result of the forwarding terminals under each grouping dimension.

In an embodiment, the transmission condition satisfied by the candidate forwarding terminals is that a total sum rate of frequency bands of selected candidate forwarding terminals is greater than or equal to a data size of the to-be-transmitted data.

Accordingly, the sending terminal 10 also includes a terminal re-determination module.

The terminal re-determination module is configured to, if the currently determined candidate forwarding terminals do not satisfy the transmission condition, return to re-execute determining the candidate forwarding terminals from the forwarding terminal group according to the received pre-response message.

Figure 8:
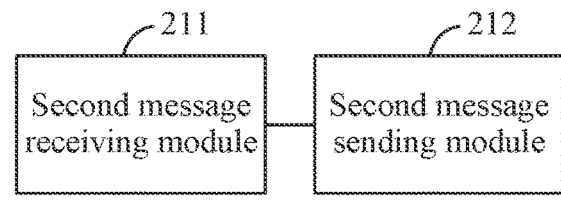
FIG. 8 is a diagram illustrating the structure of a forwarding terminal in the data communication system according to embodiment four of the present disclosure.

FIG. 8 is a diagram illustrating the structure of a forwarding terminal in a data communication system according to embodiment four of the present disclosure. As shown in FIG. 8, a forwarding terminal 21 includes a second message receiving module 211 and a second message sending module 212.

The second message receiving module 211 is configured to receive a pre-request message sent by a sending terminal, send the pre-request message to a receiving terminal in a receiving terminal group, and receive a pre-response message generated by the receiving terminal based on the pre-request message.

The second message sending module 212 is configured to perform channel precoding according to the pre-response message, encapsulate determined antenna gain information in the pre-response message after the precoding is completed, and return the pre-response message to the sending terminal.

Figure 9:
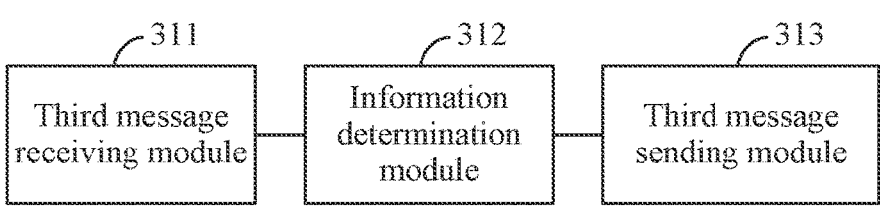
FIG. 9 is a diagram illustrating the structure of a receiving terminal in the data communication system according to embodiment four of the present disclosure.

FIG. 9 is a diagram illustrating the structure of a receiving terminal in a data communication system according to embodiment four of the present disclosure. As shown in FIG. 9, a receiving terminal 31 includes a third message receiving module 311, an information determination module 312, and a third message sending module 313.

The third message receiving module 311 is configured to receive a pre-request message sent by a forwarding terminal in a forwarding terminal group.

The information determination module 312 is configured to determine a received signal strength indication and channel capacity information of the receiving terminal to the forwarding terminal according to the pre-request message.

The third message sending module 313 is configured to encapsulate the received signal strength indication and channel capacity information in a pre-response message and send the pre-response message to the forwarding terminal.

The data communication system provided in this embodiment of the present disclosure may execute the data communication method provided in any embodiment of the present disclosure and has functional modules and beneficial effects corresponding to the executed method.

Embodiment Five

Figure 10:
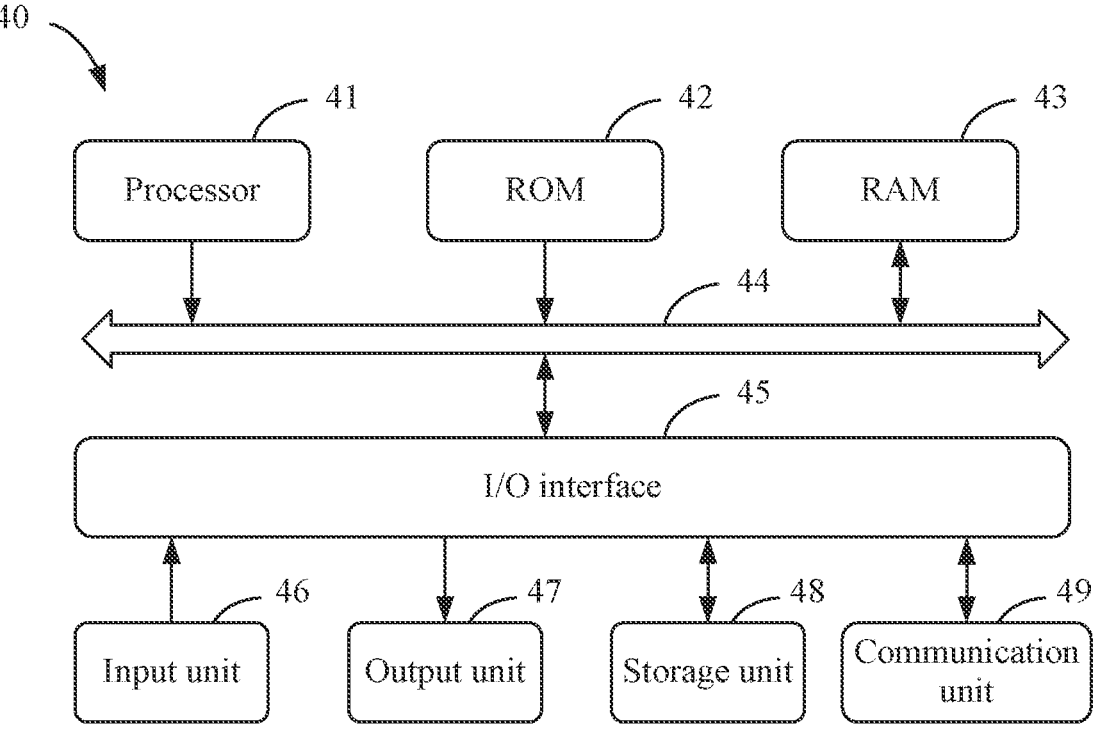
FIG. 10 is a diagram illustrating the structure of an electronic device according to embodiment five of the present disclosure.

FIG. 10 illustrates the structure of an electronic device 40 for implementing embodiments of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device (such as a helmet, glasses, or a watch), or a similar computing apparatus. Herein the shown components, the connections and relationships between these components, and the functions of these components are illustrative only and are not intended to limit the implementation of the present disclosure as described and/or claimed herein.

As shown in FIG. 10, the electronic device 40 includes at least one processor 41 and a memory communicatively connected to the at least one processor 41, such as a read-only memory (ROM) 42 and a random access memory (RAM) 43. The memory stores a computer program that can be executed by the at least one processor. The processor 41 may perform various appropriate actions and processing according to a computer program stored in the ROM 42 or a computer program loaded into the RAM 43 from a storage unit 48. Various programs and data required for the operation of the electronic device 40 are also stored in the RAM 43. The processor 41, the ROM 42, and the RAM 43 are connected to each other through a bus 44. An input/output (I/O) interface 45 is also connected to the bus 44.

Multiple components in the electronic device 40 are connected to the I/O interface 45. The multiple components include an input unit 46 such as a keyboard or a mouse, an output unit 47 such as various types of displays or speakers, the storage unit 48 such as a magnetic disk or an optical disk, and a communication unit 49 such as a network card, a modem, or a wireless communication transceiver. The communication unit 49 allows the electronic device 40 to exchange information/data with other devices over a computer network such as the Internet and/or various telecommunications networks.

The processor 41 may be various general-purpose and/or special-purpose processing components having processing and computing capabilities. Examples of the processor 41 include, but are not limited to, a central processing unit (CPU), a graphics processing unit (GPU), a special-purpose artificial intelligence (AI) computing chip, a processor executing machine learning models and algorithms, a digital signal processor (DSP), and any appropriate processor, controller, and microcontroller. The processor 41 performs various methods and processing described above, such as the data communication method.

In some embodiments, the data communication method may be implemented as a computer program tangibly contained in a machine-readable storage medium such as the storage unit 48. In some embodiments, part or all of computer programs may be loaded and/or installed onto the electronic device 40 via the ROM 42 and/or the communication unit 49. When the computer program is loaded to the RAM 43 and executed by the processor 41, one or more steps of the preceding data communication method may be executed. Alternatively, in other embodiments, the processor 41 may be configured, in any other suitable manner (for example, by relying on firmware), to perform the data communication method.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Computer programs for implementation of the methods of the present disclosure may be written in one programming language or any combination of multiple programming languages. These computer programs may be provided for a general-purpose computer, a special-purpose computer, or another programmable data processing apparatus such that the computer programs, when executed by the processor, cause functions/operations specified in the flowcharts and/or block diagrams to be implemented. The computer programs may be executed entirely on a machine or may be executed partly on a machine. As a stand-alone software package, the computer programs may be executed partly on a machine and partly on a remote machine or may be executed entirely on a remote machine or a server.

In the context of the present disclosure, a machine-readable storage medium may be a tangible medium that may contain or store a computer program that is used by or in conjunction with a system, apparatus, or device that executes instructions. The machine-readable storage medium may include, but is not limited to, an electronic, magnetic, optical, electromagnetic, infrared, or semiconductor system, apparatus, or device, or any suitable combination thereof. Alternatively, the computer-readable storage medium may be a machine-readable signal medium. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

In order that interaction with a user is provided, the systems and techniques described herein may be implemented on an electronic device. The electronic device has a display apparatus (for example, a cathode-ray tube (CRT) or a liquid-crystal display (LCD) monitor) for displaying information to the user; and a keyboard and a pointing apparatus (for example, a mouse or a trackball) through which the user can provide input for the electronic device. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), a blockchain network, and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, also referred to as a cloud computing server or a cloud host. As a host product in a cloud computing service system, the defects of difficult management and weak service scalability in a related physical host and a virtual private server (VPS) service are solved.

It is to be understood that various forms of the preceding flows may be used with steps reordered, added, or removed. For example, the steps described in the present disclosure may be executed in parallel, in sequence, or in a different order as long as the desired results of the technical schemes in the present disclosure are implemented. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modifications, equivalent substitutions, improvements, and the like made within the spirit and principle of the present disclosure fall within the scope of the present disclosure.

What is claimed is:

1. A data communication method, being applied to a sending terminal and comprising:

generating a pre-request message and sending the pre-request message to each forwarding terminal in a forwarding terminal group;

receiving a pre-response message returned by each forwarding terminal in the forwarding terminal group, wherein the pre-response message is generated after a receiving terminal group receives the pre-request message forwarded by a corresponding forwarding terminal and is returned by the receiving terminal group to the corresponding forwarding terminal;

in response to a forwarding terminal screening condition being currently satisfied, determining candidate forwarding terminals from the forwarding terminal group according to the received pre-response message; and in response to the candidate forwarding terminals satisfying a transmission condition, forwarding to-be-transmitted data to the receiving terminal group through the candidate forwarding terminals.

2. The method according to claim 1, wherein in response to the forwarding terminal screening condition being currently satisfied, determining the candidate forwarding terminals from the forwarding terminal group according to the received pre-response message comprises:

in a case where pre-response messages returned by all forwarding terminals in the forwarding terminal group are currently received, confirming that the forwarding terminal screening condition is currently satisfied;

acquiring, in each of the pre-response messages, a received signal strength indication from a corresponding forwarding terminal to a receiving terminal in the receiving terminal group, channel capacity information from the corresponding forwarding terminal to the receiving terminal in the receiving terminal group, and antenna gain information of the corresponding forwarding terminal;

determining, according to the channel capacity information, a sum rate corresponding to the all forwarding terminals; and determining the candidate forwarding terminals from the forwarding terminal group according to the received signal strength indication, the sum rate, and the antenna gain information.

3. The method according to claim 2, wherein determining the candidate forwarding terminals from the forwarding terminal group according to the received signal strength indication, the sum rate, and the antenna gain information comprises:

determining a channel transmission frequency corresponding to each forwarding terminal in the forwarding terminal group, and determining channel frequency-domain orthogonality between forwarding terminals in the forwarding terminal group based on the channel transmission frequency;

using the received signal strength indication, the sum rate, the antenna gain information, and the channel frequency-domain orthogonality as grouping dimensions to sort the forwarding terminals under each of the grouping dimensions from large to small; and selecting, according to a sorting result of the forwarding terminals under each of the grouping dimensions, a forwarding terminal with a preset top rank in the sorting result as a candidate forwarding terminal.

4. The method according to claim 1, wherein the transmission condition satisfied by the candidate forwarding terminals is that a total sum rate of frequency bands of the selected candidate forwarding terminals is greater than or equal to a data size of the to-be-transmitted data; and accordingly, the method further comprises:

in response to the currently determined candidate forwarding terminals not satisfying the transmission condition, returning to re-execute determining the candidate forwarding terminals from the forwarding terminal group according to the received pre-response message.

5. A data communication system, comprising:

a sending terminal, a forwarding terminal group, and a receiving terminal group, wherein the forwarding terminal group comprises at least one forwarding terminal, and the receiving terminal group comprises at least one receiving terminal; and the sending terminal is configured to execute the data communication method of claim 1.

6. The system according to claim 5, wherein each of the at least one forwarding terminal comprises:

a second message receiving module configured to receive the pre-request message sent by the sending terminal, send the pre-request message to a receiving terminal in the receiving terminal group, and receive the pre-response message generated by the receiving terminal based on the pre-request message; and a second message sending module configured to perform channel precoding according to the pre-response message, encapsulate determined antenna gain information in the pre-response message after the channel precoding is completed, and return the pre-response message to the sending terminal.

7. The system according to claim 5, wherein each of the at least one receiving terminal comprises:

a third message receiving module configured to receive the pre-request message sent by a forwarding terminal in the forwarding terminal group;

an information determination module configured to determine a received signal strength indication and channel capacity information between the each of the at least one receiving terminal and the forwarding terminal according to the pre-request message; and a third message sending module configured to encapsulate the received signal strength indication and the channel capacity information in the pre-response message and send the pre-response message to the forwarding terminal.

8. An electronic device, wherein, as an execution device of a sending terminal, the electronic device comprises:

at least one processor; and a memory communicatively connected to the at least one processor, wherein the memory stores a computer program executable by the at least one processor, and the computer program is executed by the at least one processor to cause the at least one processor to execute the data communication method according to claim 1.

9. The electronic device according to claim 8, wherein the at least one processor is caused to execute, in response to the forwarding terminal screening condition being currently satisfied, determining the candidate forwarding terminals from the forwarding terminal group according to the received pre-response message by:

in a case where pre-response messages returned by all forwarding terminals in the forwarding terminal group are currently received, confirming that the forwarding terminal screening condition is currently satisfied;

acquiring, in each of the pre-response messages, a received signal strength indication from a corresponding forwarding terminal to a receiving terminal in the receiving terminal group, channel capacity information from the corresponding forwarding terminal to the receiving terminal in the receiving terminal group, and antenna gain information of the corresponding forwarding terminal;

determining, according to the channel capacity information, a sum rate corresponding to the all forwarding terminals; and determining the candidate forwarding terminals from the forwarding terminal group according to the received signal strength indication, the sum rate, and the antenna gain information.

10. The electronic device according to claim 9, wherein the at least one processor is caused to execute determining the candidate forwarding terminals from the forwarding terminal group according to the received signal strength indication, the sum rate, and the antenna gain information by:

determining a channel transmission frequency corresponding to each forwarding terminal in the forwarding terminal group, and determining channel frequency-domain orthogonality between forwarding terminals in the forwarding terminal group based on the channel transmission frequency;

using the received signal strength indication, the sum rate, the antenna gain information, and the channel frequency-domain orthogonality as grouping dimensions to sort the forwarding terminals under each of the grouping dimensions from large to small; and selecting, according to a sorting result of the forwarding terminals under each of the grouping dimensions, a forwarding terminal with a preset top rank in the sorting result as a candidate forwarding terminal.

11. The electronic device according to claim 8, wherein the transmission condition satisfied by the candidate forwarding terminals is that a total sum rate of frequency bands of the selected candidate forwarding terminals is greater than or equal to a data size of the to-be-transmitted data; and accordingly, the at least one processor is caused to further execute:

in response to the currently determined candidate forwarding terminals not satisfying the transmission condition, returning to re-execute determining the candidate forwarding terminals from the forwarding terminal group according to the received pre-response message.

12. A non-transitory computer-readable storage medium storing a computer instruction, wherein when executed by a processor, the computer instruction is configured to cause the processor to implement the data communication method according to claim 1.

13. The storage medium according to claim 12, wherein the processor is caused to implement, in response to the forwarding terminal screening condition being currently satisfied, determining the candidate forwarding terminals from the forwarding terminal group according to the received pre-response message by:

in a case where pre-response messages returned by all forwarding terminals in the forwarding terminal group are currently received, confirming that the forwarding terminal screening condition is currently satisfied;

acquiring, in each of the pre-response messages, a received signal strength indication from a corresponding forwarding terminal to a receiving terminal in the receiving terminal group, channel capacity information from the corresponding forwarding terminal to the receiving terminal in the receiving terminal group, and antenna gain information of the corresponding forwarding terminal;

determining, according to the channel capacity information, a sum rate corresponding to the all forwarding terminals; and determining the candidate forwarding terminals from the forwarding terminal group according to the received signal strength indication, the sum rate, and the antenna gain information.

14. The storage medium according to claim 13, wherein the processor is caused to implement determining the candidate forwarding terminals from the forwarding terminal group according to the received signal strength indication, the sum rate, and the antenna gain information by:

determining a channel transmission frequency corresponding to each forwarding terminal in the forwarding terminal group, and determining channel frequency-domain orthogonality between forwarding terminals in the forwarding terminal group based on the channel transmission frequency;

using the received signal strength indication, the sum rate, the antenna gain information, and the channel frequency-domain orthogonality as grouping dimensions to sort the forwarding terminals under each of the grouping dimensions from large to small; and selecting, according to a sorting result of the forwarding terminals under each of the grouping dimensions, a forwarding terminal with a preset top rank in the sorting result as a candidate forwarding terminal.

15. A data communication method, being applied to a forwarding terminal in a forwarding terminal group and comprising:

receiving a pre-request message sent by a sending termi-
nal, sending the pre-request message to a receiving
terminal in a receiving terminal group, and receiving a
pre-response message generated by the receiving ter-
minal based on the pre-request message; and performing channel precoding according to the pre-re-
sponse message, encapsulating determined antenna
gain information in the pre-response message after the
channel precoding is completed, and returning the
pre-response message to the sending terminal.

16. An electronic device, wherein, as an execution device
of a forwarding terminal, the electronic device comprises:
at least one processor; and
a memory communicatively connected to the at least one
processor,
wherein the memory stores a computer program execut-
able by the at least one processor, and the computer
program is executed by the at least one processor to
cause the at least one processor to execute the data
communication method according to claim 15.

17. A non-transitory computer-readable storage medium
storing a computer instruction, wherein when executed by a
processor, the computer instruction is configured to cause
the processor to implement the data communication method
according to claim 15.

18. A data communication method, being applied to a
receiving terminal in a receiving terminal group and com-
prising:

receiving a pre-request message sent by a forwarding
terminal in a forwarding terminal group;

determining, according to the pre-request message, a
received signal strength indication and channel capac-
ity information of the receiving terminal to the for-
warding terminal; and encapsulating the received signal strength indication and
the channel capacity information in a pre-response
message, and sending the pre-response message to the
forwarding terminal.

19. An electronic device, wherein, as an execution device
of a receiving terminal, the electronic device comprises:
at least one processor; and
a memory communicatively connected to the at least one
processor,
wherein the memory stores a computer program execut-
able by the at least one processor, and the computer
program is executed by the at least one processor to
cause the at least one processor to execute the data
communication method according to claim 18.

20. A non-transitory computer-readable storage medium
storing a computer instruction, wherein when executed by a
processor, the computer instruction is configured to cause
the processor to implement the data communication method
according to claim 18.

* * * * *